2,985,631

CROSS-LINKED POLYMERS AND METHOD FOR THEIR PREPARATION

John F. Jones, Cuyahoga Falls, and Alfred J. Mital, Brecksville, Ohio, assignors to The B. F. Goodrich Company, New York, N.Y., a corporation of New York No Drawing. Filed Nov. 23, 1959, Ser. No. 854,554

18 Claims. (Cl. 260—78.5)

This invention relates to new and useful cross-linked interpolymers derived from a monomeric mixture containing at least 10 parts by weight of alpha-beta olefinically unsaturated carboxylic acids and a minor amount of a polyunsaturated compound and to methods for their preparation and more particularly pertains to cross-linked interpolymers of at least 10 parts by weight of one or more alpha-beta olefinically unsaturated carboxylic acids and a small amount of a polyalkenylated element selected from the group consisting of silicon, germanium, tin and lead and to methods for preparing the interpolymers in a substantially moisture-free system in the presence of a polymerization catalyst.

An object of this invention is to provide new and useful cross-linked carboxylic interpolymers and their salts which, although insoluble in water, are capable of swelling rapidly to a high degree therein, even in the presence of dissolved ionic substances. Another object of this invention is to provide cross-linked carboxylic interpolymers and salts of said carboxylic interpolymers which are capable of thickening water at extremely low concentrations of said interpolymers to give gels which maintain nearly constant viscosity during prolonged periods of aging. Still another object of this invention is to provide a method of preparing the aforementioned insoluble cross-linked carboxylic interpolymers.

Water-insoluble carboxyl-containing interpolymers have been made by the polymerization of a carboxylic monomer such as acrylic acid, maleic acid or anhydride and the like in the presence of a polyfunctional monomer such as divinyl benzene; unsaturated diesters such as diallyl maleate or ethylene glycol dimethacrylate; diallyl or divinyl ethers; polyallyl ethers of polyhydric alcohols and others of the types mentioned in U.S. Patents Nos. 2,340,110, 2,340,111, 2,533,635 and 2,798,053. A number of deficiencies inherent in the interpolymers mentioned above are not found in the interpolymers of this invention. The copolymerization of divinyl benzene with carboxylic monomers produces interpolymers which are not uniformly cross-linked throughout. The copolymers of divinyl benzene and carboxylic monomers consist of heterogeneous mixtures of completely insoluble, moderately swellable, and completely soluble interpolymers when divinyl benzene is used in proportions of 5% by weight or less in the polymerization recipe. Carboxylic monomers copolymerized with the unsaturated diesters, diallyl and divinyl ethers produce interpolymers which are subject to ready hydrolysis in water at high temperatures and for prolonged aging periods at room temperature in the presence of alkalis and acids. Insoluble carboxylic interpolymers known prior to the time of the present invention are subject to a marked deswelling action in water when comparatively high concentrations of water-soluble ionic materials are added thereto. Many of the previously known insoluble carboxylic interpolymers are generally subject to some molecular breakdown in water which is evidenced by viscosity decrease over a period of time at elevated temperatures or upon prolonged aging at ambient temperatures. The previously known insoluble carboxylic interpolymers and salts thereof have little or no ability to thicken water in concentrations below 0.25% and the complete dispersion of the interpolymers in water often requires several hours even with stirring.

The interpolymers of this invention, however, exhibit a remarkable ability to thicken water in the presence of gross amounts of dissolved ionic salts, an unusual ability to thicken water at extremely low interpolymer concentrations, and the ability to disperse completely in water in a matter of minutes to form mucilages which maintain substantially constant viscosity on aging at elevated temperatures.

We have discovered that useful, rapid swelling, ion-resistant interpolymers having unusual thickening efficiency are obtained when an alpha-beta olefinically unsaturated carboxylic monomer or anhydride thereof is copolymerized with from about .0005 to about 6% by weight based on the remaining polymerizable ingredients of a cross-linking agent conforming to the structure

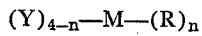

$$(Y)_{4-n}\text{—M—}(R)_n$$

in which R is an alkenyl group having from 2 to 4 carbon atoms with terminal unsaturation such as vinyl, allyl and methallyl and Y is a hydrocarbon group of from 1 to 10 carbon atoms having no olefinic unsaturation such as methyl, ethyl, propyl, butyl, amyl, hexyl, heptyl, octyl, nonyl, decyl, cyclopentyl, cyclohexyl, phenyl and naphthyl, $n$ is a number from 2 to 4 and M is a member of the group consisting of silicon, germanium, tin and lead. The properties of the interpolymers vary depending upon the nature of the carboxylic monomer or carboxylic anhydride monomer, the nature of the cross-linking agent and the proportions of cross-linking agent used. With 0.0005 to 6% by weight of cross-linking agent in the interpolymer, water-insoluble interpolymers result which per se, and especially in the form of their salts, have the ability to imbibe large quantities of water with consequent many times increase in volume. Such interpolymers resemble, but are greatly superior to, naturally occurring water-swellable gums, such as gum tragacanth, which are commonly used in commerce as thickening and suspending agents. The properties of the interpolymers of this invention can be altered to a controlled degree by variation of the level of cross-linking agent used in the polymerization recipe. Rapid dispersibility, resistance to hydrolytic breakdown, and excellent thickening efficiency on the other hand, are properties inherent in the carboxylic interpolymers cross-linked with from about 0.0005 to about 6% of said cross-linking agent. The swelling indexes in water of the interpolymers of this invention vary from greater than 24,000 to 400 depending upon the specific monomer system used and the degree of cross-linking accomplished.

The swelling index of a given polymer is the number of milliliters of distilled water required to swell completely one gram of a given polymer. Because the polymers embodied in the present invention do not form grainy or bead-like swollen gel particles in water but rather clear and homogeneous mucilages, the swelling index measurements cannot be made in the conventional manner which involves adding the polymer to an excess of water, allowing it to swell completely and removing the swollen gel by means of a coarse filter prior to determining the amount of water it has imbibed. Because of the unusual thickening efficiency and non-grainy nature of the aqueous mucilages which the polymers of this invention provide, the swelling index must be determined by adding water to a given polymer in increments and plotting viscosity vs. concentration of polymer and extrapolating the curve to just above zero viscosity. The zero viscosity dispersion of polymer in water represents a completely swollen polymer and any viscosity greater than about one represents a mucilage containing polymer which has not been completely swollen.

The water-swellable interpolymers of this invention are useful for preparing printing pastes, thickening of flood water for secondary crude oil recovery, sand suspensions in oil and water well treatment, auto polishes and cleaners, household polishes and cleaners, carrying agents and the like. Moreover the carboxylic interpolymers of this invention cross-linked with compounds conforming to the structure $$(Y)_{4-n}-M-(R)_n$$

as defined above, wherein M is Si and Sn, are useful in applications such as liquid and paste dentifrices, surgical jellies, creams and ointments, hair styling preparations, bulk laxatives and the like.

In the production of the interpolymers of this invention we employ a monomeric mixture which contains two essential monomeric ingredients, each in certain proportions, one being an olefinically unsaturated carboxylic acid such as acrylic acid, maleic acid or anhydride, sorbic acid and the like and the other being a cross-linking agent as herein defined. Other monoolefinic monomeric materials may be present in the monmeric mixture if desired, even in predominant proportion, with the production of highly useful, water-insoluble, water-swellable carboxylic type interpolymers.

In the alpha-beta olefinically unsaturated acids the close proximity of the strongly polar carboxyl group to the double bonded carbon atoms has a strong activating influence rendering the substances containing this structure very readily polymerizable.

Representative monoolefinically unsaturated monocarboxylic acids useful for preparing the cross-linked interpolymers of this invention include acrylic acid, methacrylic acid, ethacrylic acid, alpha-fluoro, chloro, bromo and iodo acrylic acids and crotonic acid or anhydrides of one or a mixture of the above acids.

Representative monoolefinically unsaturated polycarboxylic acids include maleic acid, fumaric acid, citraconic acid, mesaconic acid, glutaconic acid or anhydrides thereof and halogen substituted derivatives of the acids or anhydrides.

Representative polyolefinically unsaturated monocarboxylic acids are pentadiene-2,4-oic acid, sorbic acid, anhydrides thereof and halogen substituted derivatives.

All the above olefinically unsaturated acids, halogenated derivatives and anhydrides are defined herein and in the claims as "alpha-beta olefinically unsaturated lower aliphatic acids."

The preferred carboxylic monomers for use in this invention are the monoolefinic acrylic acids having the general structure.

$$CH_2=C(A)-COOH$$

wherein A is hydrogen, halogen and a lower alkyl group. Illustrative acrylic acids of this preferred class are acrylic acid itself, methacrylic acid, ethacrylic acid, alpha-halo acrylic acid and a substantially equimolar mixture of maleic anhydride and another monomer copolymerizable therewith. Alpha-halo acrylic acids readily hydrolyze at the halogen substituent with the formation of hydroxyl and lactone groups. Of this class, acrylic acid itself is most preferred because of its generally lower cost, ready availability, and ability to form superior polymers.

The monomeric proportions to be employed in the production of multicomponent interpolymers may vary in a somewhat similar manner. However, since the swelling capacity (or swelling index) of the low-level cross-linked interpolymers depends primarily on the presence of a minimum amount of carboxyl groups in the interpolymer chain, it is generally desirable to utilize as much of the carboxylic monomer or monomers and as little of the other monomeric constituents as is consistent with the necessary water sensitivity, dispersibility, emulsification, suspension, thickening and other desirable properties. In these interpolymers, therefore, the carboxylic monomer or monomers should never be less than 10% and preferably not less than 20% by weight of the total monomeric mixture.

Multicomponent interpolymers may be made from monomeric mixtures comprising from about 10 to about 95% of a carboxylic monomer such a acrylic acid, about 0.0005 to about 6% of a cross-linking agent as herein defined, and about 5 to almost 90% of an additional monomer or monomers. Preferred for use as water-swellable artificial gums are tripolymers resulting from the polymerization of monomeric mixtures containing, respectively, from about 20 to about 95% by weight of acrylic acid, about 0.1 to about 3% by weight of a cross-linking agent as herein defined, and about 4 to about 79.9% of an additional monomer or monomers copolymerizable with the acid and cross-linking agent such as maleic anhydride, N-methyl acrylamide, N-ethyl acrylamide, N-t-butyl acrylamide, methyl vinyl ether, ethyl vinyl ether, n-butyl vinyl ether, styrene and isobutylene. Interpolymers can be made from mixtures of maleic anhydride, a vinyl alkyl ether such as methyl vinyl ether, and a cross-linking agent as herein defined in which the sum of the moles of vinyl ether is substantially equivalent to the molar quantity of maleic anhydride present. It is to be understood that in the above proportions, if a maximum amount of two of the monomers are utilized that somewhat less than maximum amounts of the other monomers must be utilized.

Additional monomers suitable for the production of multicomponent interpolymers, as above described, are monoolefinic monomers such as the fluoro-, chloro-, bromo-, iodo-, and ethoxy styrenes, acrylamide, methacrylamide, N,N,-dimethyl acrylamide, acrylonitrile, methacrylonitrile, vinylidene cyanide, methyl acrylate, ethyl acrylate, propyl acrylates, butyl acrylates, amyl acrylates, hexyl acrylates, cyclohexyl acrylate, heptyl acrylates, octyl acrylates, methyl methacrylate, methyl ethacrylate, vinyl acetate, vinyl propionate, vinyl butyrate, isopropenyl acetate, isopropenyl propionate, isopropenyl butyrate, vinyl benzoate, isopropenyl benzoate, vinyl pyridines, vinyl chloride, vinyl bromide, vinylidene chloride, vinylidene bromide, vinylidene chlorobromide, vinyl carbazole, vinyl pyrrolidone, vinyl piperidines, vinyl pyrimidines, methyl vinyl ketone, ethyl vinyl ketone, methyl isopropenyl ketone, ethylene, dimethyl maleate, diethyl maleate, dimethyl fumarate, diethyl fumarate, and many others. In addition to the above monoolefinic monomers, many of the divinyl, dialkenyl or other polyfunctional esters, amides, ethers, ketones, anhydrides and the like may be utilized in the production of multicomponent interpolymers, especially those polyfunctional monomers which normally function as cross-linking or insolubilizing monomers but which are easily saponified and hydrolyzed to additional hydroxyl, carboxyl and other hydrophilic groups. For example, interpolymers of acrylic acid and diesters such as diallyl maleate, ethylene glycol dimethacrylate, acrylic anhydride, methacrylic anhydride, beta-allyloxy acrylates and many others are readily saponified or hydrolyzed by alkali or acid with the introduction of additional hydroxyl and/or carboxyl groups into said polymers. Of the above additional monomers N-methyl acrylamide, acrylonitrile, methyl vinyl ether, ethyl vinyl ether, ethylene, isobutylene and styrene have been found particularly useful for the production of water-swellable gum-like interpolymers.

Illustrative cross-linking agents of the above mentioned type which are useful in this invention are the hydrocarbon substituted silanes such as tetraallyl silane, tetramethallyl silane, tetravinyl silane, triallyl methyl silane, triallyl vinyl silane, triallyl methallyl silane, diallyl dimethyl silane, diallyl divinyl silane, diallyl dimethallyl silane, trivinyl allyl silane, trivinyl methallyl silane, divinyl dimethallyl silane, trimethallyl allyl silane, trimethallyl vinyl silane, trivinyl methyl silane, divinyl dimethyl silane, trimethallyl methyl silane, dimethallyl dimethyl silane and the like and the hydrocarbon substituted germanes such as tetraallyl germane, tetramethallyl germane, tetravinyl germane, triallyl methyl germane, triallyl vinyl germane, triallyl methallyl germane, diallyl dimethyl germane, diallyl divinyl germane, diallyl dimethallyl germane, trivinyl allyl germane, trivinyl methallyl germane, divinyl dimethallyl germane, trimethallyl allyl germane, trimethallyl vinyl germane, trivinyl methyl germane, divinyl dimethyl germane, trimethallyl methyl germane, dimethallyl dimethyl germane and the like and the hydrocarbon substituted tin compounds such as tetraallyl tin, tetramethallyl tin, tetravinyl tin, triallyl methyl tin, triallyl vinyl tin, triallyl methallyl tin, diallyl dimethyl tin, diallyl divinyl tin, diallyl dimethallyl tin, trivinyl allyl tin, trivinyl methallyl tin, divinyl dimethallyl tin, trimethallyl allyl tin, trimethallyl vinyl tin, trivinyl methyl tin, divinyl dimethyl tin, trimethallyl methyl tin, dimethallyl dimethyl tin and the like and the hydrocarbon substituted lead compounds such as tetraallyl lead, tetramethallyl lead, tetravinyl lead, triallyl methyl lead, triallyl vinyl lead, triallyl methallyl lead, diallyl dimethyl lead, diallyl divinyl lead, diallyl dimethallyl lead, trivinyl allyl lead, trivinyl methallyl lead, divinyl dimethallyl lead, trimethallyl allyl lead, trimethallyl vinyl lead, trivinyl methyl lead, divinyl dimethyl lead, trimethallyl methyl lead, dimethallyl dimethyl lead and others.

The preferred cross-linking agents for the purpose of this invention are those having four alkenyl groups of from 2 to 4 carbon atoms per molecule because of the greater cross-linking efficiency derived therefrom. Illustrative examples of the preferred cross-linking agents for this invention are tetraallyl silane, tetravinyl silane, tetramethallyl silane, diallyl divinyl silane, dimethallyl divinyl silane, tetraallyl germane, tetravinyl germane, tetramethallyl germane, tetraallyl tin, tetravinyl tin, tetramethallyl tin, tetraallyl lead, tetravinyl lead and tetramethallyl lead. Of these the polyalkenyl silanes are more preferable because of low cost and ready availability of the halo silane intermediates.

The cross-linking agents as herein defined are made by the reaction between the alkenyl Grignard reagent and the halide of silicon, germanium, tin or lead. Tetraallyl tin, for example, is made by the reaction of approximately 5 moles of allyl magnesium bromide with one mole of stannic chloride in diethyl ether. The mixed alkyl-alkenyl compounds are prepared by the same general procedure, for example, trivinyl methyl silane is made by treating one mole of trichloromethyl silane with approximately 4 moles of vinyl magnesium bromide in tetrahydrofuran. In this reaction allyl magnesium bromide, methallyl magnesium bromide and vinyl magnesium bromide are generally preferred over allyl magnesium chloride, methallyl magnesium chloride and vinyl magnesium chloride because the bromides are more reactive, more readily soluble in ethers and they produce greater yields of the desired product. The cross-linking agents resulting from reaction between said alkenyl Grignards and halides of silicon, germanium, tin or lead are not always pure compounds but rather are usually mixtures containing varying amounts of alkenyl groups per molecule. Analysis of such materials, therefore, reveals only the average number of alkenyl groupings on each molecule. These mixtures, however, if they are found by analysis to contain an average number of alkenyl groups of at least about two, are capable of producing the insoluble carboxylic polymers of this invention. Since the efficiency of the cross-linking agents of this invention increases with the number of polymerizable groups on the molecule, it is much preferred to utilize cross-linking agents containing an average of two or more alkenyl groups per molecule.

In the monomeric polymerization mixture the two essential monomers should be present in certain proportions, although the exact proportions will vary considerably depending upon the characteristics desired in the interpolymer. The cross-linking agents of this invention copolymerize readily in two-component monomer mixtures having the carboxylic monomer as the second component in the range of from about 0.0005 to about 6% cross-linking agent to give interpolymers which in the form of their monovalent salts have swelling indexes from more than 24,000 to no less than 400. Interpolymers of this type are all insoluble in water and organic solvents and the water sensitivity of said interpolymers is greatest in the range of from about 0.01 to about 3% cross-linking agent especially when said interpolymers are in the form of their monovalent salts. Polymeric monovalent salts of this type, especially acrylic acid interpolymers, containing 0.1 to 3% cross-linking agent swell greatly with the absorption of thousands of times their own weight of water. When from about 0.0005 to about 6% of the cross-linking agent is copolymerized with a substantially equimolar mixture of maleic anhydride and another monomer copolymerizable therewith high swelling interpolymers also are obtained. Such low-level cross-linked interpolymers are superior to artificial gum-like materials suitable for use in mucilaginous compositions as replacements for the naturally occurring gums such as gum tragacanth and they are useful in mucilaginous compositions in which the natural gums will not function because of ionic deswelling, instability and inefficiency of thickening.

Unusually stable aqueous dispersions of water-insoluble pigments such as titanium dioxide result when 0.05 part by weight of a cross-linked interpolymer of this invention, 10 parts by weight of titanium dioxide and 100 parts by weight of distilled water containing sufficient alkali to give a final pH of about 7 are homogenized in a colloid mill. Dispersions of this type maintain uniform concentrations of dispersed pigment throughout the aqueous phase which is a property useful in water-based paints, coatings, sprays and the like.

The preferred method of preparation of the interpolymers of this invention is the polymerization in an inert diluent having some solubilizing action on one or more of the monomeric ingredients but substantially none on the resultant interpolymer. Polymerization in mass may be employed, but is not preferred because of the difficulty in working up the solid polymeric masses obtained. Polymerization in an aqueous medium containing a water-soluble free-radical catalyst is useful, the product resulting either as a granular precipitate or as a highly swollen gel, either of which may be used directly or are easily further sub-divided and dried. Polymerization in an organic liquid which is a solvent for the monomers but a non-solvent for the interpolymer, or in a mixture of such solvents, in the presence of a solvent-soluble free-radical catalyst such as benzoyl peroxide and azobisisobutyronitrile is most preferred because the product is usually obtained as a very fine friable and often fluffy precipitate which, after solvent removal, seldom requires grinding or other further treatment before use. Suitable solvents for the latter method include benzene, toluene, xylene, ethyl benzene, tetralin, hexane, heptane, octane, carbon tetrachloride, methyl chloride, ethyl chloride, ethylene dichloride, bromotrichloro methane, chlorobenzene, acetone, methyl ethyl ketone, and others, and mixtures of these and other solvents.

Polymerization in the diluent medium may be carried out in the presence of a free-radical catalyst in a closed vessel in an inert atmosphere and under autogenous pressure or artificially-induced pressure or in an open vessel under reflux at atmospheric pressure. The temperature of the polymerization may be varied from 0° C. or lower to 100° C. or higher, more preferably from 20° to 90° C., depending to a large degree upon the activity of the monomers and catalyst used and the molecular weight desired in the polymeric product. The molecular weights of said interpolymers are greater for those made in the lower temperature range than for those made in the higher temperature range. Polymerization at 50° to 90° C. under atmospheric pressure using a free-radical catalyst is generally effective in producing a polymer yield of 75 to 100% of theory in less than 10 hours, usually in less than 5 hours. Suitable free-radical catalysts include peroxides such as sodium, potassium and ammonium persulfates, caprylyl peroxide, benzoyl peroxide, and pelargonyl peroxide, hydrogen peroxide, cumene hydroperoxides, tertiary butyl diperphthalate, tertiary butyl perbenzoate, sodium peracetate, sodium percarbonate and the like as well as azobisisobutyronitrile and others. Other catalysts utilizable are the so-called "redox" type of catalyst and the heavy-metal activated catalyst systems. Generally from about 0.5 to 2.5% by weight or more of catalyst is sufficient in the process of the present invention. Polymerization may also be induced by radicals formed in the polymerization system by nuclear radiation, X-rays and ultraviolet radiation.

The high swelling interpolymers of this invention are especially useful in soft, mucilaginous compositions. These interpolymers generally do not attain their maximum volume in water until a portion of the free carboxyl groups in said interpolymers are converted to an alkali, ammonium or amine salt. As the percent neutralization of the free carboxyl groups is increased, the ratio of volume in distilled water to unit weight of interpolymer gradually increases to a maximum in the range of 50 to 90% and then decreases as complete neutralization is approached. Neutralization to the extent of about 75% produces a pH of about 7. The neutralizing agent is preferably a monovalent alkali such as sodium, potassium, lithium or ammonium hydroxide or the carbonates and bicarbonates thereof, or mixtures of the same and also amine bases having not more than one primary or secondary amine group per molecule. Polyvalent bases such as calcium hydroxide, magnesium hydroxide or aluminum hydroxide, and in fact any polyvalent metal cation, have a strong deswelling action on the water-swollen interpolymers and their salts. In spite of this the interpolymers of this invention exhibit much greater swelling action than the naturally occurring gum-like materials such as gum tragacanth and the like in the presence of the same deswelling agents. It is sometimes desirable, because of their effect on the viscosity and thixotropy of the water-swollen interpolymer gels, to neutralize the interpolymer with up to 25% of a polyvalent metal base such as calcium hydroxide, magnesium hydroxide and the like.

The cross-linking agents used in the examples to follow are readily prepared by the reaction of at least a one molar equivalent excess of the desired alkenyl magnesium halide with the appropriate silicon, germanium, tin and lead halide. This coupling reaction is illustrated in the following procedure for the preparation of tetraallyl germane. Five moles of allyl magnesium bromide are prepared by the slow addition of five moles of allyl bromide to slightly more than five moles of magnesium turnings in anhydrous diethyl ether. The allyl magnesium bromide etherate is decanted from the insoluble solid material and one mole of germanium tetrachloride is added slowly to the allyl magnesium bromide etherate. The mixture is refluxed for 4 to 8 hours and is then hydrolyzed with an excess of dilute HCl. The product is recovered from the dried organic layer by removal of the ether by flash distillation. The residual somewhat viscous oil is found to have an iodine number of 411 which is in good agreement with the calculated iodine number of 429 for pure tetraallyl germane.

This is a continuation-in-part of the application of John F. Jones and Alfred J. Mital, Serial No. 701,328, filed December 9, 1957.

The invention as described above is further illustrated by the following examples. The proportions of ingredients are given in parts by weight unless otherwise specified.

Example I

The cross-linking agents of this invention which are prepared in the manner mentioned above are utilized in preparing copolymers with acrylic acid by a batch-charging technique. A series of acrylic acid, tetraallyl silane copolymers wherein the level of tetraallyl silane is varied are made in this manner from the following ingredients:

|  | Parts |
|---|---|
| Acrylic acid (98–100% pure) | 100. |
| Tetraallyl silane | Variable. |
| Benzoyl peroxide | 2.0. |
| Benzene | 880. |

The reactions are carried out in an oxygen-free atmosphere in a sealed container at 50° C. The polymerization is essentially complete in each case in from 2 to 18 hours with the formation of a thick polymer slurry. The copolymers are isolated by filtration with suction or centrifugation, washed on the filter or in the centrifuge with fresh benzene, and finally dried in a circulating air oven at 50° C. The yield of copolymer is 98–100% in each case. The dried cake is a white, friable mass which is readily converted to a fine white powder. An aqueous mucilage of each polymer is made by dispersion of 1.5 g. of polymer in 100 g. of distilled water which contains sufficient NaOH to give a pH of approximately 7 to the final mucilage. The mucilages reach their maximum swell in from 3 to 5 minutes after addition of the copolymer to the dilute alkali. In this example and in those which follow the viscosities of the aqueous mucilages are obtained with a Brookfield rotational viscometer at 10 r.p.m. unless otherwise specified and the viscosities are expressed in centipoises.

| Percent Tetraallyl Silane in Polymer | Viscosities | | | |
|---|---|---|---|---|
| | 1.5% Conc. | 0.5% Conc. | 0.125% Conc. | 0.0156% Conc. |
| 0.0005 | 280 | 100 | 120 | 0 |
| 0.1 | 10,400 | 2,400 | 560 | 120 |
| 0.5 | 52,800 | 21,600 | 12,000 | 1,000 |
| 1.0 | ¹ 198,400 | 90,400 | 16,000 | 0 |
| 2.0 | 329,600 | 27,200 | 320 | 0 |
| 18.0 | 5 | 0 | 0 | 0 |

¹ The clarity of this mucilage was compared to that of an acrylic acid, 1% hexaallyl sucrose copolymer mucilage having the same concentration and pH. The transmission of light through said acrylic acid, tetraallyl silane mucilage was 43% greater than the transmission of light through the acrylic acid, hexaallyl sucrose mucilage at a wave length of 5000 A. The light transmission measurements were made with a Beckman DK-2 recording spectrophotometer.

The above polymer containing 18% tetraallyl silane and having swelling index of less than 100 is not within the scope of the present invention.

The exceptional resistance of these cross-linked copolymers to ionic deswelling in water is demonstrated in the following table wherein the viscosities for 1% aqueous copolymer mucilages versus the sodium chloride concentration in the mucilage at pH of about 7 are given.

| Percent Tetraallyl Silane in Copolymer | Viscosities | | | |
|---|---|---|---|---|
| | 1% NaCl | 2% NaCl | 3% NaCl | 4% NaCl |
| 0.2 | 3,200 | 2,400 | 1,600 | 800 |
| 0.3 | 8,000 | 4,800 | 4,000 | 3,200 |
| 0.4 | 20,000 | 9,600 | 5,600 | 3,200 |
| 0.5 | 16,800 | 9,600 | 6,400 | 2,700 |

The copolymers which are cross-linked with greater than 0.5% tetraallyl silane are less effective thickening agents in 4% salt water than those shown in the above table. Copolymers of the type shown above are excellent thickeners for the flood water used in the secondary crude oil recovery process because of their ability to thicken the salt water ordinarily used in the flooding operation as well as their inherent stability, thickening efficiency and ability to pass through the sand and shale of the underground strata from which the crude oil must be recovered.

90% ethyl acrylate, 10% tetraallyl silane copolymers were prepared and samples of each were refluxed in 20% NaOH and in 20% $H_2SO_4$ solution for more than 24 hours. The hydrolysis products in no way resembled the acrylic acid, tetraallyl silane copolymers of this invention. The 1.5% polymer mucilage of the hydrolyzed ethyl acrylate, tetraallyl silane copolymers had no measurable viscosity at pH 7.

*Example II*

A series of acrylic acid, 1% tetraallyl silane copolymers are prepared by the same general procedure mentioned in Example I and the variables of temperature, catalyst and solvent are studied. Azobisisobutyronitrile at the 1.5% level and 2.0% caprylyl peroxide or benzoyl peroxide are used. A constant level of 1% tetraallyl silane is maintained throughout in this example.

| Solvent | Temperature, °C. | Catalyst | Viscosity at pH 7 | |
|---|---|---|---|---|
| | | | 1.5% Conc. | 0.125% Conc. |
| Acetone | 50 | Azobisisobutyronitrile. | 64,000 | 1,600 |
| Ethylene dichloride | | | 184,000 | 12,800 |
| Toluene | | | 26,400 | 6,400 |
| Xylene | | Caprylyl peroxide. | 2,700 | 320 |
| Hexane | | | 192,000 | 32,000 |
| Chlorobenzene | | | 196,800 | 9,600 |
| Benzene | 40 | Benzoyl peroxide. | 200,000 | 32,200 |

A variety of organic diluents can be used as polymerization media for these copolymers and mixtures of organic diluents of the types shown above and the like can be used as well. All of the copolymers described above disperse rapidly in the dilute NaOH solution used in mucilage preparation and all of the mucilages are exceptionally clear and colorless.

*Example III*

Methacrylic acid, tetraallyl silane copolymers are prepared in an inert organic diluent as described in Example I. The variation of the level of tetraallyl silane of from 0.25 to 10 parts per 100 parts of methacrylic acid in these copolymers produces products having varying thickening properties at pH 7. The methacrylic acid, tetraallyl silane copolymer containing 2% tetraallyl silane, for example, forms aqueous mucilages at pH 7 which have viscosities of 131,200 cps. at 1.5% copolymer concentration, 36,000 cps. at 0.5% copolymer concentration and 2,400 cps. at 0.125% copolymer concentration. These mucilages are all exceptionally clear and suffer no appreciable viscosity decrease when aged for several months at room temperature. The 0.25% aqueous mucilages of the polymers containing 10, 8 and 7% tetraallyl silane had no measurable viscosity at pH 7 whereas the corresponding aqueous mucilages of the polymers containing 6 and 5% tetraallyl silane exhibited viscosities of 700 and 1,940 cps., respectively. This demonstrates that at levels of cross-linking agent greater than 6% the polymers suffer a drastic loss of thickening ability in aqueous media when used in small quantities.

In accordance with Example 3 in U. S. Patent No. 2,438,612 and Example 4 in U.S. Patent No. 2,628,246, two methyl methacrylate tetraallyl silane copolymers, designated A and B below, were prepared in 4 oz. bottles from the following recipes:

| | A, g. | B, g. |
|---|---|---|
| Methyl methacrylate | 9.5 | 9.9 |
| Tetraallyl silane | 0.5 | 0.1 |
| Benzoyl peroxide | 0.1 | 0.1 |

The polymerizations were carried out at 75° C. for about 4 hours. The resulting polymers were glass-like clear, colorless and brittle.

In accordance with Example 4 in U.S. Patent No. 2,438,612 and Example 5 in U.S. Patent No. 2,628,246, a n-butyl methacrylate tetraallyl silane copolymer, designated polymer C, was prepared from the following ingredients in a 4 oz. glass bottle:

| | C, g. |
|---|---|
| n-Butyl methacrylate | 9.9 |
| Tetraallyl silane | 0.1 |
| Benzoyl peroxide | 0.1 |

The bottle containing the above mixture of ingredients was heated for 18 hours in an oil bath maintained at a temperature of 100° C. A clear, colorless glass-like polymer resulted.

Each of the polymers designated above as A, B and C was pulverized to a granular powder. Two gram quantities each of powdered A, B and C were refluxed for 24 hours in 20% aqueous sulfuric acid to cause hydrolysis of the ester groups. The insoluble hydrolyzed polymers were isolated by filtration, they were dried and 1.5 g. of each of the dried hydrolysis product was placed in 100 ml. of distilled water and the pH was adjusted to about 7 with sodium hydroxide. The polymers retained their particulate form and no swelling and no measurable viscosity was found for the aqueous suspensions of the acid hydrolysis products of polymers A, B and C.

Powdered polymers A, B and C were subjected to alkaline hydrolysis in 20% aqueous sodium hydroxide in the manner described for the acid hydrolysis. The polymers retained their particulate form and no swelling or measurable viscosity was found for the 1.5% aqueous suspensions of the dried alkaline hydrolysis products of powdered polymers A, B and C.

Two grams of powdered polymer B was refluxed for 24 hours in a 20% solution of potassium hydroxide in ethanol. The opaque hydrolysis product was removed by filtration, was washed free of excess potassium hydroxide with fresh ethanol and was dried at 50° C. The dried product showed a very slight degree of swell in distilled water at 1.5% polymer concentration and a pH of about 7. Only the viscosity of water was measurable for the aqueous polymer slurry which consisted of a small volume of slightly swollen polymer particles in a large volume of water.

Neither the acid hydrolyzed nor the alkali hydrolyzed 90% methyl methacrylate, 10% tetraallyl silane copolymer give a measurable viscosity above that of water itself in water at 1.5% polymer concentration at a pH of approximately seven.

*Example IV*

A copolymer is made from a batch charged recipe of the following type:

| | Parts |
|---|---|
| Acrylic acid (98–100%) | 100 |
| Acetic anhydride | 166 |
| Tetraallyl silane | 1.0 |
| Benzoyl peroxide | 2.0 |
| Benzene | 880 |

The reaction is carried out at 50° C. in a sealed reactor in the absence of oxygen. Polymerization time is 18 hours. The copolymer is isolated by filtration or centrifugation and is vacuum dried at 50° C. over solid KOH.

This cross-linked polyacrylic anhydride copolymer is then made up into an aqueous mucilage at pH 7 in distilled water and the following mucilage viscosities are obtained.

Polymer concentration: Viscosity
- 1.5% ———————————— 28,800
- 1.0% ———————————— 16,000
- 0.5% ———————————— 8,800
- 0.25% ——————————— 4,000

These copolymer mucilages have excellent ion resistance.

*Example V*

The interpolymers of this example are made in a batch charge from the following materials:

| | Parts |
|---|---|
| Maleic anhydride | 63. |
| Methyl vinyl ether | 37. |
| Tetraallyl silane | Variable. |
| Benzoyl peroxide | 2.0. |
| Benzene | 880. |

The polymerizations are carried out in sealed reactors in an oxygen free system at 50° C. for from 2 to 18 hours. The thick slurries are filtered or centrifuged and washed with fresh benzene prior to drying the interpolymer. The yields are quantitative and the dried interpolymers exist as white powders.

The viscosities of aqueous mucilages of representative interpolymers of this type are determined with the Brookfield viscometer equipped with Helipath attachment using a number 5 spindle at 4 r.p.m. The mucilages are at pH 7 throughout and viscosity values are viscometer dial readings.

| Percent Tetraallyl Silane in Polymer | Viscosities | | | |
|---|---|---|---|---|
| | 1.5% | 1.0% | 0.5% | 0.25% |
| 0.5 | 79 | 38 | 21 | 9 |
| 1.0 | 128 | 60 | 44 | 26 |
| 2.0 | 232 | 154 | 131 | 80 |
| 3.0 | 500 | 500 | 195 | 29 |

The mucilages were water clear and the gels varied from "ropey" at low tetraallyl silane levels to extremely "short" at higher levels. Interpolymers similar to these result when equimolar quantities of other alkyl vinyl ethers such as ethyl vinyl ether, propyl vinyl ether and butyl vinyl ether are used in place of the methyl vinyl ether in this example.

*Example VI*

Maleic anhydride, isobutylene, tetraallyl silane interpolymers are made by the procedure described in Example V. The weight ratio of maleic anhydride to isobutylene is held constant at 63.5 to 36.5 respectively and the level of tetraallyl silane is varied between 0.5 and 3.0 parts per 100 based on the mixture of anhydride and isobutylene. Benzene is used as the diluent and 1% benzoyl peroxide is employed as initiator. The interpolymers of this example are similar in properties to those described in Example V, for example, the maleic anhydride, isobutylene, 1% tetraallyl silane interpolymer has pH 7 aqueous mucilage viscosities of 100,000 cps. at 1.5% interpolymer concentration, 40,000 cps. at 0.5% interpolymer concentration and 1,920 cps. at 0.06% interpolymer concentration. These mucilages are clear and extremely stable to heat and long standing at room temperature. Substitution of ethylene, propylene or styrene for isobutylene in the above monomeric mixture yields polymers having substantially similar properties to those described in this example.

*Example VII*

Interpolymers of maleic anhydride, isobutylene, acrylic acid and tetraallyl silane are made by the procedure described in Example V. The proportions of maleic anhydride, isobutylene and acrylic acid are held constant at 57.25 parts, 32.75 parts and 10 parts respectively in this example and the level of tetraallyl silane is varied between 0.25 and 1.5 parts per 100 parts of the mixture of the remaining monomers. The dried interpolymers are fine white powders. The aqueous mucilages of these interpolymers show excellent viscosity at pH 7, for example, the interpolymer containing 1.5% tetraallyl silane has viscosities of 108,800 cps. at 1.5% interpolymer concentration, 86,400 cps. at 1% interpolymer concentration and 6,400 cps. at 0.125% interpolymer concentration. These interpolymers disperse completely in 2 to 5 minutes when stirred into the dilute NaOH solution used to make the pH 7 mucilages.

*Example VIII*

Interpolymers of maleic anhydride, styrene, acrylic acid and tetraallyl silane are prepared in the manner described in Example V. The ratio of maleic anhydride, styrene, and acrylic acid is held constant at 43.5, 46.5 and 10 parts respectively and the tetraallyl silane is varied between 0.25 to 1.0 part per 100 parts of the mixture of the remaining polymerizable ingredients. These interpolymers are made at 50° C. in the absence of air with benzoyl peroxide catalyst. The aqueous mucilages of these interpolymers at pH 7 generally tend to be on the "short" side. The viscosities of a representative interpolymer of this type, the one containing 0.5% tetraallyl silane, are 95,200 cps. at 1.5% interpolymer concentration, 35,600 cps. at 0.5% interpolymer concentration and 1,120 cps. at 0.125% interpolymer concentration.

*Example IX*

Acrylic acid, tetravinyl silane copolymers are made from a batch charged recipe as follows:

| | Parts |
|---|---|
| Acrylic acid (98–100% pure) | 100. |
| Tetravinyl silane | Variable. |
| Benzoyl peroxide | 2.0. |
| Benzene | 880. |

The polymerization time is from 2 to 18 hours at 50° C. in closed containers in the absence of oxygen. The yields are quantitative. Aqueous mucilages are made up at pH 7 in 3 to 5 minutes after addition of the copolymer to the aqueous alkali.

| Percent Tetravinyl Silane in Polymer | Viscosities | | | |
|---|---|---|---|---|
| | 1.5% Conc. | 0.5% Conc. | 0.25% Conc. | 0.125% Conc. |
| 0.0005 | 240 | 60 | 20 | 0 |
| 0.5 | 40,000 | 10,000 | 3,000 | 1,600 |
| 1.0 | 88,000 | 40,000 | 28,800 | 20,800 |
| 2.0 | 177,600 | 89,800 | 48,000 | 20,800 |
| 3.0 | 267,200 | 106,400 | 38,400 | 10,400 |

The mucilages are all water-clear and have excellent resistance to deswelling by ionic materials. The copolymer containing only 0.0005 part of tetravinyl silane has a measurable aqueous mucilage viscosity at 0.25% polymer concentration.

*Example X*

Methacrylic acid, tetravinyl silane copolymers are made in the manner described in Example IX. Copolymers containing up to 6% tetravinyl silane thicken water at pH in the range of 7 at polymer concentrations 0.25% and less. However, the methacrylic acid, 10% tetravinyl silane copolymer made in benzene at 70° C. with benzoyl peroxide catalyst has aqueous mucilage viscosities of 20 cps. at 1.5% copolymer concentration and 0 cps. at 0.5% and 0.25% copolymer concentration. Neither the acid hydrolyzed nor the alkali hydrolyzed 90% methyl methacrylate, 1% tetravinyl silane copolymer gives a measurable viscosity in water at pH 7 in the range of 1.5% polymer concentration.

Example XI

A recipe similar to that described in Example IV is used in which tetravinyl silane is substituted for the tetraallyl silane. The copolymer containing 1% tetravinyl silane has aqueous pH 7 mucilage viscosities of 37,000 cps. at 1.5 copolymer concentration, 1,600 cps. at 0.12% copolymer concentration, and 160 cps. at 0.015% copolymer concentration.

Example XII

In this example a single change is made in the polymerization recipe used in Example V, that is, tetravinyl silane is substituted for the tetraallyl silane. The interpolymers are worked up in the manner described and quantitative yields are realized in each case. The mucilage viscosities of the maleic anhydride, methyl vinyl ether, 2% tetravinyl silane interpolymers have a viscosity at pH 7 of 2,400 at 1.5% concentration, and they exhibit appreciable viscosities at 0.25% polymer concentration and lower.

Example XIII

In the recipes used in Example VI tetravinyl silane is used in place of tetraallyl silane. The interpolymers are isolated in quantitative yields. A 3% tetravinyl silane interpolymer provided a thick, clear mucilage at pH 7 and 1.5% concentration it had a viscosity of 140 and at 0.25% concentration it had a viscosity of 20.

Example XIV

Interpolymers of maleic anhydride, isobutylene, acrylic acid and from 0.25 to 1.5% tetravinyl silane are made in the manner described in Example VII. The interpolymers form thick aqueous mucilages at pH 7. The interpolymer containing 1% tetravinyl silane, for example, has aqueous mucilage viscosities of 36,800 at 1.5% interpolymer concentration, 20,000 cps. at 0.5% interpolymer concentration and 20 cps. at 0.015% interpolymer concentration. These polymers show excellent ion resistance and excellent ability to keep solid matter such as coarse sand suspended uniformly through the mucilage for long periods of time.

Example XV

The interpolymers of this example differ from those described in Example VIII only in that the tetraallyl silane is replaced with tetravinyl silane. The interpolymers are all excellent thickening agents for water. The interpolymer which has optimum viscosity concentration properties is the maleic anhydride, styrene, acrylic acid, 1% tetravinyl silane interpolymer which gives at 1.5% polymer concentration in distilled water at pH 7 a viscosity of 480 and a viscosity of 40 at 0.25% polymer concentration. Thickening efficiency for interpolymers of this type is good even in those interpolymers made with less than 0.25% tetravinyl silane.

Example XVI

The acrylic acid, 0.5 to 3.0% triallyl methyl silane copolymers prepared by the procedure described in Example I are excellent thickeners for water in the range of pH 7. The acrylic acid, 0.5% triallyl methyl silane copolymer aqueous mucilages viscosities range from 48,000 cps. at 1.5% copolymer concentration to 800 cps. at 0.015% copolymer concentration. These mucilages suspend solid particles such as titanium dioxide and carbon black in water even at extremely low copolymer concentrations.

Example XVII

Acrylic acid, 0.5 to 5.0% diallyl dimethyl silane copolymers are prepared by the procedure described in Example I, and maleic anhydride, methyl vinyl ether, 0.5 to 3% diallyl dimethyl silane interpolymers are prepared by the method given in Example V. The most efficient thickeners in each of these interpolymer systems are those interpolymers which contain from 1 to 3% diallyl dimethylsilane.

Example XVIII

Acrylic acid, 0.5 to 3% tetramethallyl silane copolymers are prepared in benzene at 50° C. in the presence of 2% benzoyl peroxide as described in Example I. The copolymers of this example are excellent water thickeners even in the presence of gross amounts of salt. A 1% aqueous mucilage of the acrylic acid, 2% tetramethallyl silane copolymer at pH 7 has a viscosity of 8000 cps. in 2% salt solution, 4000 cps. in a 3% salt solution and 2400 cps. in 4% salt solution. Natural gums such as gum tragacanth impart negligible viscosity to a 4% salt brine at the same polymer concentration.

Example XIX

Tetramethallyl silane resembles tetraallyl silane as a cross-linking agent when copolymerized in proportions of 0.25 to 3% with methacrylic acid; acrylic acid in acetic anhydride; maleic anhydride, methyl vinyl ether; maelic anhydride, ethylene; maleic anhydride propylene; maleic anhydride, isobutylene; acrylic acid; and maleic anhydride, styrene, acrylic acid as described in Examples III, IV, V, VII and VIII respectively. Illustrative specific interpolymers of these types are a maleic anhydride, methyl vinyl ether, 3% tetramethallyl silane interpolymer at pH 7 in water having viscosities of 172,800 cps. at 1.5% interpolymer concentration, 88,000 cps. at 0.5% interpolymer concentration and 20,000 cps. at 0.125% interpolymer concentration and a maleic anhydride, styrene, acrylic acid, 1% tetramethallyl silane interpolymer which has aqueous mucilage viscosities of 72,000 cps. at 1.5% interpolymer concentration and 2,400 cps. at 0.25% interpolymer concentration at pH 7.

Example XX

Dimethallyl dimethyl silane and divinyl dimethyl silane are somewhat less effective than the cross-linking agents mentioned in the preceding examples, but they do produce cross-linked copolymers when copolymerized at levels of from 0.25 to 3% with carboxylic monomers as illustrated by the acrylic acid, 0.5% divinyl dimethyl silane copolymer which has a viscosity of 140 cps. at 1.5% copolymer concentration and the acrylic acid, 3% dimethallyl dimethyl silane has a Brookfield Helipath viscosity of 1.5% copolymer concentration of 69 in distilled water at pH 7 and the same polymers give measurable viscosities in water at 0.25% concentration.

Example XXI

The copolymers of acrylic acid and from 0.5 to 3% trivinyl methyl silane are excellent thickeners for water systems. The acrylic acid, 3% trivinyl methyl silane copolymer, for example, has aqueous mucilage viscosities of 12,800 cps. at 1.5% copolymer concentration, 2,400 cps. at 0.5% copolymer concentration and 320 cps. at 0.062% copolymer concentration at pH 7.

Example XXII

The cross-linked carboxylic polymers which result from the copolymerization of diallyl divinyl silane with one or more carboxylic monomers are extremely efficient thickeners which have a high degree of resistance to ionic deswelling. The acrylic acid, 2% diallyl divinyl silane copolymer, for example, has viscosities of 57,600 cps. at 1.5% copolymer concentration, 19,200 cps. at 0.125% copolymer concentration and 3,600 cps. at 0.031% copolymer concentration in distilled water at pH 7. The resistance to ions is demonstrated by the fact that a 1% aqueous mucilage at pH 7 has viscosities of 24,800 cps. in 1% NaCl brine, 13,600 cps. in 2% brine, 7,200 cps. in 3% brine and 4,000 cps. in 4% brine.

Example XXIII

The cross-linked carboxylic interpolymers prepared with from 0.5 to 3% tetraallyl germane and from 0.5 to 3% tetravinyl germane are extremely stable when aged in water at pH 7 at elevated temperatures for extended periods of time. This is a useful property in applications where long shelf life or resistance to elevated temperatures is desired. To more fully illustrate this property a 0.1% aqueous mucilage at pH 7 of an acrylic acid, 1% tetraallyl germane copolymer was aged at 65° C. in a closed container for one month. The initial and final viscosities for this mucilage were both 12,000 cps. showing there was no breakdown of the copolymer. A 3% aqueous mucilage of gum tragacanth which was aged under the same conditions had an initial viscosity of 42,000 cps. and a final viscosity of 2,600 cps. after aging at 65° C. for 28 days.

Methacrylic acid, 0.5 to 6% tetraallyl germane copolymers thicken water well even at low concentrations and have excellent ion resistance and ability to age well at elevated temperatures. The methacrylic acid, 2% tetraallyl germane copolymer has aqueous mucilage viscosities at pH 7 of 20,000 cps. at 1.5% copolymer concentration and 520 cps. at 0.062% copolymer concentration. The maleic anhydride, methyl vinyl ether, 3% tetraallyl germane interpolymer has aqueous mucilage viscosities at pH 7 of 209,600 at 1.5% interpolymer concentration, 9,600 cps. at 0.125% interpolymer concentration and 5,600 cps. at 0.062% interpolymer concentration. The acrylic acid, 1% tetravinyl germane copolymer has aqueous mucilage viscosities at pH 7 of 25,600 cps. at 1.5% copolymer concentration, 7,800 cps. at 0.5% copolymer concentration and 2,000 cps. at 0.125% copolymer concentration. All of these interpolymers form water-clear mucilages.

Example XXIV

Arcylic acid, 0.5 to 3% tetraallyl tin; acrylic acid, 0.5 to 3% tetravinyl tin; and acrylic acid, tetraallyl lead copolymers are excellent thickeners for water and are as stable as the corresponding germane polymers. The maleic anhydride, methyl vinyl ether, 0.5 to 3% tetravinyl tin interpolymers have a wide range of thickening efficiency exemplified by the 1.5% aqueous mucilage viscosity of 4,000 cps. for the 1% tetravinyl tin interpolymer, 86,000 cps. for the 2% tetravinyl tin interpolymer and 131,200 cps. for the 3% tetravinyl tin interpolymer. The acrylic acid, tetraallyl lead copolymers have comparable properties.

Example XXV

Mixtures of the cross-linking agents useful in this invention often function as well as or in a superior fashion to a single component cross-linking agent. To illustrate this point a series of acrylic acid interpolymers cross-linked with mixtures containing various combinations of tetraallyl silane, tetraallyl germane and tetravinyl tin are made in the manner described for interpolymers in Example I. The aqueous mucilage viscosities of these interpolymers are made in the pH range of 6–8 and the viscosities listed below are determined in the manner herein described.

| Cross-linking agent | Cross-linking agent, percent in interpolymer | | | |
|---|---|---|---|---|
| | A | B | C | D |
| Tetraallyl silane | 0.5 | 0.5 | | 0.35 |
| Tetraallyl germane | 0.5 | | 0.5 | 0.35 |
| Tetravinyl tin | | 0.5 | 0.5 | 0.35 |

| Mucilage Concentration | Viscosities | | | |
|---|---|---|---|---|
| | A | B | C | D |
| 1.5% | 192,000 | 83,200 | 67,200 | 105,600 |
| 0.5% | 139,000 | 52,800 | 30,400 | 72,000 |
| 0.125% | 8,000 | 16,000 | 12,800 | 11,200 |

The above mucilages were all clear and stable on aging.

Example XXVI

This example illustrates the use of a monomer other than a carboxylic monomer in conjunction with the carboxyl monomer and a cross-linking agent as herein defined. A series of acrylic acid, acrylonitrile, tetraallyl silane interpolymers is used in this example. The interpolymers are prepared in benzene at 50° C. with 2% benzoyl peroxide by the general procedure described in Example I.

A constant level of 1% tetraallyl silane is used and the ratio of the weight of acrylonitrile to acrylic acid is varied from 90:10 to 75:25 respectively.

| Ratio of the Weight of Acrylonitrile to Acrylic Acid | Aqueous Mucilage Viscosities | | |
|---|---|---|---|
| | 1.5% | 1.0% | 0.5% |
| 90:10 | 7,320 | 2,820 | 20 |
| 85:15 | 33,200 | 7,600 | 40 |
| 80:20 | 104,000 | 2,200 | 200 |
| 75:25 | 129,600 | 36,000 | 300 |

The above polymers gave measurable aqueous mucilage viscosities at concentration of 0.25%. Levels of acrylonitrile below 75% will also give excellent water-swellable interpolymers in this system. Other hydrophobic monomers and mixtures of same such as styrene, vinyl acetate, vinyl chloride and the like when used in place of acrylonitrile in this example yield hydrophilic interpolymers having comparable properties.

The above description and examples are intended to be illustrative only. Any modification or variation therefrom which conforms to the spirit of this invention is intended to be included within the scope of the claims.

We claim:

1. A resinous interpolymer of (A) one hundred parts by weight of a member selected from the group consisting of (1) from 10 to 100% by weight of a member selected from the group consisting of acrylic acid and methacrylic acid and from 0 to 90% by weight of a member selected from the group consisting of N-methyl acrylamide, acrylonitrile, methyl vinyl ether, ethyl vinyl ether, ethylene, isobutylene and styrene and (2) substantially equimolar quantities of maleic anhydride and a monoolefinically unsaturated monomer selected from the class consisting of ethylene, propylene, isobutylene, styrene and methyl vinyl ether and (B) from 0.0005 to 6% by weight based on the weight of (A) of a cross-linking agent conforming to the structure

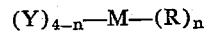

wherein R represents an alkenyl group having 2 to 4 carbon atoms with terminal unsaturation, Y represents a hydrocarbon group having from 1 to 10 carbon atoms free of non-benzenoid unsaturation, $n$ is an integer of from 2 to 4 and M is a member of the group consisting of silicon, germanium, tin and lead, said interpolymer having a swelling index of at least 400 in distilled water at pH about 7.

2. A composition comprising a resinous copolymer of an unsubstituted alpha,beta-olefinically unsaturated monocarboxylic acid having from 3 to 4 carbon atoms and terminal unsaturation with from 0.0005 to 6% by weight based on the weight of said acid of a cross-linking agent conforming to the structure

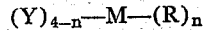

wherein R represents an alkenyl group having 2 to 4 carbon atoms having terminal unsaturation, Y represents a hydrocarbon group having from 1 to 10 carbon atoms free of non-benzenoid unsaturation, $n$ is a number of from 2 to 4 and M is a member of the group consisting of silicon, germanium, tin and lead, said interpolymer having a swelling index of at least 400 in distilled water at pH about 7.

3. The resinous interpolymer of (1) substantially equimolar proportions of maleic anhydride and a monoolefinic terminally unsaturated monomer containing from 2 to 8 carbon atoms copolymerizable with said anhydride and (2) from 0.0005 to 6% by weight based on (1) of a cross-linking agent conforming to the structure $$(Y)_{4-n}-M-(R)_n$$

in which R represents an olefinic hydrocarbon having from 2 to 4 carbon atoms with terminal unsaturation, Y represents a hydrocarbon group of from 1 to 10 carbon atoms free of non-benzenoid unsaturation, $n$ is a number of from 2 to 4 and M is a member of the group consisting of silicon, germanium, tin and lead, said interpolymer having a swelling index of at least 400 in distilled water at pH about 7.

4. The resinous interpolymer of acrylic acid and from about 0.0005 to about 6% by weight of tetraallyl silane, said interpolymer having a swelling index of at least 400 in distilled water at pH about 7.

5. The resinous interpolymer of acrylic acid and from about 0.0005 to about 6% by weight of tetravinyl silane, said interpolymer having a swelling index of at least 400 in distilled water at pH about 7.

6. The resinous interpolymer of acrylic acid and from about 0.0005 to about 6% by weight of tetravinyl germane, said interpolymer having a swelling index of at least 400 in distilled water at pH about 7.

7. The resinous interpolymer of acrylic acid and from about 0.0005 to about 6% by weight of tetraallyl germane, said interpolymer having a swelling index of at least 400 in distilled water at pH about 7.

8. The resinous interpolymer of acrylic acid and from about 0.0005 to about 6% by weight of tetravinyl tin, said interpolymer having a swelling index of at least 400 in distilled water at pH about 7.

9. The method for preparing cross-linked resinous interpolymers of (A) one hundred parts by weight of a member selected from the group consisting of (1) from 10 to 100% by weight of a member selected from the group consisting of acrylic acid and methacrylic acid and from 0 to 90% by weight of a member selected from the group consisting of N-methyl acrylamide, acrylonitrile, methyl vinyl ether, ethyl vinyl ether, ethylene, isobutylene and styrene and (2) substantially equimolar quantities of maleic anhydride and a monoolefinically unsaturated monomer selected from the class consisting of ethylene, propylene, isobutylene, styrene and methyl vinyl ether and (B) from 0.0005 to 6% by weight based on the weight of (A) of a cross-linking agent conforming to the structure $$(Y)_{4-n}-M-(R)_n$$

wherein R represents an alkyl group having 2 to 4 carbon atoms with terminal unsaturation, Y represents a hydrocarbon group having from 1 to 10 carbon atoms free of non-benzenoid unsaturation, $n$ is an integer of from 2 to 4 and M is a member of the group consisting of silicon, germanium, tin and lead, said interpolymers having swelling indices of at least 400 in distilled water at pH about 7, said method comprising polymerizing the monomers in an inert organic liquid at temperatures of from about 0° C. to about 100° C. in an essentially oxygen-free system with a free radical catalyst.

10. The method of claim 9 wherein the polymerization temperature is from 20° C. to 90° C.

11. The method of claim 9 wherein the organic liquid is a liquid hydrocarbon.

12. The method of claim 11 wherein the liquid hydrocarbon is benzene.

13. The method of claim 11 wherein the liquid hydrocarbon is toluene.

14. The method of claim 11 wherein the liquid hydrocarbon is hexane.

15. The method of claim 10 wherein the organic liquid is ethylene dichloride.

16. The method of claim 10 wherein the catalyst is benzoyl peroxide.

17. The method of claim 10 wherein the catalyst is caprylyl peroxide.

18. The method of claim 10 wherein the catalyst is azobisisobutyronitrile.

References Cited in the file of this patent

UNITED STATES PATENTS

| | | |
|---|---|---|
| 2,253,128 | Langkammerrer | Aug. 19, 1941 |
| 2,258,718 | Rothrock | Oct. 14, 1941 |
| 2,388,161 | Kropa | Oct. 30, 1945 |
| 2,628,246 | Mackenzie | Feb. 10, 1953 |
| 2,873,288 | Rosenberg | Feb. 10, 1959 |

FOREIGN PATENTS

| | | |
|---|---|---|
| 641,268 | Great Britain | Aug. 9, 1950 |